United States Patent
Eriksson

(10) Patent No.: US 11,513,208 B2
(45) Date of Patent: Nov. 29, 2022

(54) METHOD FOR DETERMINING SPIN OF A PROJECTILE

(71) Applicant: TOPGOLF SWEDEN AB, Danderyd (SE)

(72) Inventor: Jonny Eriksson, Danderyd (SE)

(73) Assignee: Topgolf Sweden AB, Danderyd (SE)

( * ) Notice: Subject to any disclaimer, the term of this patent is extended or adjusted under 35 U.S.C. 154(b) by 0 days.

(21) Appl. No.: 17/613,678

(22) PCT Filed: May 27, 2021

(86) PCT No.: PCT/EP2021/064210
§ 371 (c)(1),
(2) Date: Nov. 23, 2021

(87) PCT Pub. No.: WO2021/244943
PCT Pub. Date: Dec. 9, 2021

(65) Prior Publication Data
US 2022/0221572 A1    Jul. 14, 2022

(30) Foreign Application Priority Data
Jun. 3, 2020   (SE) .................................. 2030185-9

(51) Int. Cl.
*G01S 13/62* (2006.01)
*G01S 13/58* (2006.01)
(Continued)

(52) U.S. Cl.
CPC ............ *G01S 13/62* (2013.01); *G01S 13/583* (2013.01); *G01S 7/415* (2013.01); *G01S 13/584* (2013.01); *G01S 13/723* (2013.01)

(58) Field of Classification Search
CPC ........ A63B 2024/0034; A63B 69/3658; A63B 2220/35; A63B 24/0021; A63B 2220/89;
(Continued)

(56) References Cited

U.S. PATENT DOCUMENTS 5,246,232 A * 9/1993 Eccher ................... G01S 13/58
                                                                     473/199
5,281,971 A * 1/1994 Moulton ................. G01S 7/415
                                                                      342/13
(Continued)

FOREIGN PATENT DOCUMENTS

| EP | 0239156 A1 | 9/1987 |
|---|---|---|
| WO | WO8703359 A1 | 6/1987 |
| WO | WO2018138708 A1 | 8/2018 |

OTHER PUBLICATIONS

Swedish Patent Application No. 2030185-9, Notice Regarding Attestation of the Final Documents, dated Oct. 25, 2021, 21 pages.
(Continued)

*Primary Examiner* — Olumide Ajibade Akonai
(74) *Attorney, Agent, or Firm* — Fish & Richardson P.C.

(57) ABSTRACT

A method for estimating a spin of a projectile, the method comprising obtaining from a radar transceiver a first time series comprising observations of a radial velocity of the projectile relative to the radar transceiver, calculating, from the first time series, a center velocity of the projectile, extracting from the first time series a second time series comprising a variation in the first time series around the calculated center velocity estimating a frequency of the second time series, and determining the spin of the projectile WO based on the estimated frequency of the second time series.

17 Claims, 4 Drawing Sheets

(51) Int. Cl.
   *G01S 7/41* (2006.01)
   *G01S 13/72* (2006.01)

(58) Field of Classification Search
   CPC ............ A63B 2220/34; A63B 37/0003; A63B 24/0003; A63B 71/0605; A63B 37/0096; G01S 13/58; G01S 13/88; G01S 13/72; G01S 13/66; G01S 7/415; G01S 13/42; G01S 13/589; G01S 13/52; G01S 13/581; G01S 13/583; G01S 13/86; G01S 7/356; G01S 13/584; G01S 13/723; G01S 17/04; G01S 7/41; G01S 19/19; G01S 13/62; G01S 13/582; G01S 7/2883; G06T 2207/30241; G06T 2207/10044
   See application file for complete search history.

(56) References Cited

U.S. PATENT DOCUMENTS

| | | | |
|---|---|---|---|
| 6,244,971 | B1 | 6/2001 | Mihran |
| 8,845,442 | B2 | 9/2014 | Tuxen |
| 9,036,864 | B2* | 5/2015 | Johnson ............... G06T 7/20 382/103 |
| 9,645,235 | B2 | 5/2017 | Tuxen |
| 9,649,545 | B2 | 5/2017 | Dawe |
| 9,855,481 | B2 | 1/2018 | Tuxen |
| 9,868,044 | B2 | 1/2018 | Johnson |
| 9,911,046 | B1* | 3/2018 | Yakimenko ............ G06T 7/60 |
| 10,151,831 | B2 | 12/2018 | Johnson |
| 10,379,213 | B2* | 8/2019 | Saegusa ............... G01S 13/583 |
| 10,393,870 | B2 | 8/2019 | Tuxen |
| 10,471,328 | B2 | 11/2019 | Tuxen |
| 10,593,048 | B2 | 3/2020 | Keat |
| 10,775,492 | B2 | 9/2020 | Johnson |
| 10,835,803 | B2 | 11/2020 | Okur |
| 10,850,179 | B2 | 12/2020 | Tuxen |
| 10,962,635 | B2 | 3/2021 | Tuxen |
| 11,311,789 | B2* | 4/2022 | DeLeon ............... G01S 13/583 |
| 2002/0107078 | A1* | 8/2002 | Collins ............. A63B 24/0021 473/152 |
| 2009/0075744 | A1 | 3/2009 | Tuxen |
| 2011/0286632 | A1 | 11/2011 | Tuxen |
| 2014/0191896 | A1 | 7/2014 | Johnson |
| 2015/0087443 | A1 | 3/2015 | Kitazaki |
| 2016/0048975 | A9 | 2/2016 | Tuxen |
| 2016/0067581 | A1 | 3/2016 | Tuxen |
| 2016/0243423 | A1 | 8/2016 | Tuxen |
| 2016/0306035 | A1 | 10/2016 | Johnson |
| 2016/0339320 | A1 | 11/2016 | Johnson |
| 2017/0054950 | A1* | 2/2017 | Yeo ..................... G01S 13/88 |
| 2017/0246543 | A1 | 8/2017 | Dawe |
| 2017/0254892 | A1 | 9/2017 | Tuxen |
| 2018/0005385 | A1 | 1/2018 | Suk |
| 2018/0011184 | A1* | 1/2018 | Du Toit ............... G01S 13/726 |
| 2018/0136326 | A1 | 5/2018 | Schuck |
| 2018/0221746 | A1 | 8/2018 | Joo |
| 2018/0318687 | A1 | 11/2018 | Tuxen |
| 2018/0367764 | A1 | 12/2018 | Kim |
| 2019/0049571 | A1 | 2/2019 | Johnson |
| 2019/0255413 | A1 | 8/2019 | Oh |
| 2019/0282881 | A1 | 9/2019 | Tuxen |
| 2019/0369226 | A1 | 12/2019 | Tuxen |
| 2020/0023235 | A1 | 1/2020 | Hermansen |
| 2020/0030679 | A1 | 1/2020 | Tuxen |
| 2020/0110166 | A1 | 4/2020 | Tuxen |
| 2020/0265593 | A1 | 8/2020 | Keat |
| 2020/0298092 | A1 | 9/2020 | Okur |
| 2020/0330830 | A1* | 10/2020 | Carew-Jones ....... A63B 43/004 |
| 2020/0346091 | A1 | 11/2020 | Oh |
| 2020/0355826 | A1 | 11/2020 | Smothermon et al. |
| 2020/0355827 | A1* | 11/2020 | Smothermon ......... G01S 13/88 |
| 2020/0398137 | A1 | 12/2020 | Tuxen |
| 2021/0008417 | A1 | 1/2021 | Tuxen |
| 2021/0052940 | A1 | 2/2021 | Tuxen |
| 2021/0069569 | A1 | 3/2021 | Oh |

OTHER PUBLICATIONS

Swedish Patent Application No. 2030185-9, Response to Notice dated Mar. 22, 2021, filed Sep. 21, 2021, 16 pages.
International Application No. PCT/EP2021/064210, Written Opinion of the International Search Authority and International Search Report, dated Aug. 18, 2021, 13 pages.
DR 5000 User's Guide, Program Options, DR 5000 Spin Calculation, 1 page.
Henri Johnson, Doppler Radar, Doppler Radar Spin Measurement, May 10, 2013, 4 pages.
Swedish Patent Application No. 2030185-9, Notice and Search Report, dated Mar. 22, 2021, 8 pages.

* cited by examiner

ETHOD FOR DETERMINING SPIN OF A
PROJECTILE

TECHNICAL FIELD

The present disclosure relates to the use of radar transceivers to determine the spin of a projectile.

BACKGROUND

When monitoring the path of a projectile, it can be advantageous to be able to determine its rate of rotation, or spin, as it will affect the overall path of the projectile. This can for instance be of importance when monitoring the path of a sports ball such as a baseball or golf ball.

U.S. Pat. No. 8,845,442 discloses a method for determining the spin of a sports ball comprising calculating the spin from a modulation frequency of a reflected radar signal and harmonics of said modulation frequency.

U.S. Pat. No. 9,868,044 discloses a method for determining the spin of a projectile from a periodic component of a reflected radar signal.

However, there is a need for more refined methods for determining the spin of a projectile.

SUMMARY

It is an object of the present disclosure to provide a method for determining the spin of a projectile.

This object is obtained by a method for estimating a spin of a projectile, the method comprising obtaining from a radar transceiver a first time series comprising observations of a radial velocity of the projectile relative to the radar transceiver, calculating, from the first time series, a center velocity of the projectile, extracting from the first time series a second time series comprising a variation in the first time series around the calculated center velocity, estimating a frequency of the second time series, and determining the spin of the projectile based on the estimated frequency of the second time series.

The variation in the first time series around the center velocity of the projectile is caused by reflections of the radar signal from features of the projectile, as said features rotate towards or away from the radar due to the spin. Thus, the frequency of the second time series depends on the spin rate, and the spin can easily be determined from the frequency.

The method may also comprise dividing the second time series into a plurality of time intervals, estimating a plurality of frequencies of the second time series, where each frequency corresponds to a respective time interval in the plurality of time intervals, and determining the spin of the projectile based on the plurality of estimated frequencies.

Advantageously, dividing the second time series into a plurality of time intervals may yield a more reliable final estimate of the spin. The estimated value of the frequency corresponding to a time interval can be affected by measurement noise or measurement errors, rendering it potentially unreliable. With a plurality of estimated frequencies, it is possible to apply statistical methods to obtain a final estimate of the spin that is more reliable than an estimate derived from a single estimated frequency.

According to aspects, determining the spin of the projectile based on the plurality of estimated frequencies comprises obtaining a distribution of the plurality of estimated frequencies.

According to other aspects, the method may comprise that a time interval between observations in the first time series is at most half an expected period of rotation of the projectile at a highest expected spin. This has the advantage that at least two observations of the radial velocity are obtained per rotation of the projectile, ensuring that the variation in the radial velocity due to spin is captured in the first time series.

According to aspects, the time interval between observations in the first time series is constant.

According to other aspects, the time interval between observations in the first time series is variable.

The center velocity may be calculated through use of a low-pass filter or through piecewise fitting of a function to the first time series. Advantageously, both methods can yield reliable estimates of the center velocity.

According to aspects, the second time series may be extracted through subtraction of the calculated center velocity from the first time series.

According to aspects, estimating the frequency of the second time series may comprise using a power spectrum calculated from the second time series as a basis for a maximum likelihood estimation of the frequency. Advantageously, a power spectrum provides a measure of the power associated with each frequency present in the signal, which facilitates estimation of the frequency.

According to aspects, the frequency may be a fundamental frequency of the signal. Advantageously, the fundamental frequency is generally equivalent to the spin rate.

The object is also obtained by a radar transceiver arranged to obtain a first time series comprising observations of a radial velocity of the projectile relative to the radar transceiver and calculate, from the first time series, a center velocity of the projectile. The radar transceiver is further arranged to extract a second time series comprising a variation in the first time series around the center velocity, estimate a frequency of the second time series, and determine the spin of the projectile based on the frequency of the second time series.

The radar transceiver may also be arranged to divide the second time series into a plurality of time intervals, estimate a plurality of frequencies of the second time series, where each frequency corresponds to a respective time interval in the plurality of time intervals, and determine the spin of the projectile based on the plurality of estimated of the frequencies.

According to aspects, the radar transceiver may be a frequency modulated continuous wave, FMCW, radar transceiver.

The object is further obtained by a system for measurement of the spin of a projectile, the system comprising a radar transceiver as described above and at least one means of displaying the determined spin. Advantageously, incorporating a means of displaying the determined spin enables easier access to the determined spin for a person using the system.

According to aspects, the system may comprise an auxiliary sensor, and the spin estimate from the radar transceiver is combined with data obtained from the auxiliary sensor. Advantageously, combining the spin estimate with data obtained from an auxiliary sensor may facilitate evaluation of the projectile trajectory by a person using the system.

The radar transceivers and systems disclosed herein are associated with the same advantages as discussed above in relation to the different methods.

According to aspects, the object may also be obtained by a processor arranged to execute a method according to what is described above, or by a system comprising a radar transceiver and a processor arranged to execute one of the methods described herein.

Finally, the object is also obtained by a computer program for operating a radar transceiver to determine the spin of a projectile, the computer program comprising computer code which, when run on processing circuitry of a radar transceiver causes the radar transceiver to execute any of the methods herein described, and by a computer program product comprising a computer program as described above, and a computer readable storage medium on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTIONS OF THE DRAWINGS

The present disclosure will now be described more in detail with reference to the appended drawings, where:

FIG. 1 schematically illustrates observation of a projectile by a radar transceiver;

FIG. 2 schematically illustrates the change in radial velocity of a projectile over time;

FIG. 3 schematically illustrates a distribution of estimates of the spin of a projectile;

FIG. 4 schematically illustrates a power spectrum;

DETAILED DESCRIPTION

Figure 1:
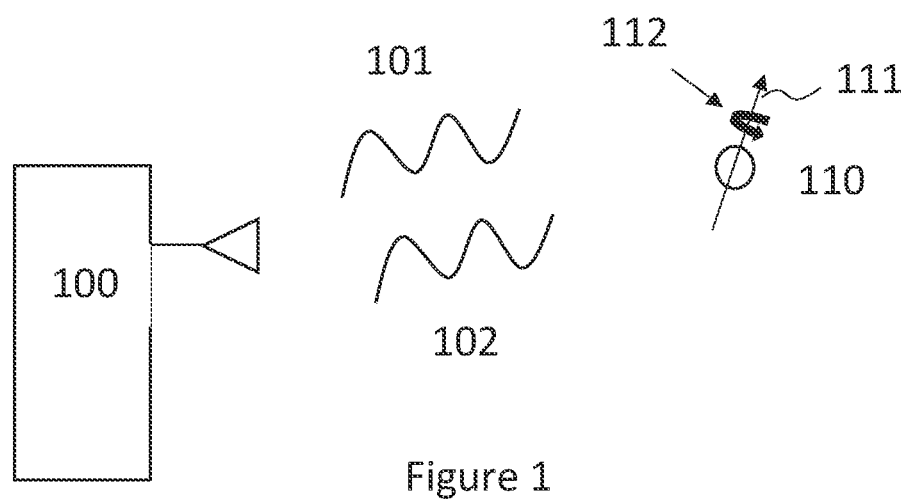

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Measurement of a projectile trajectory with a radar transceiver entails the radar transceiver emitting a radar signal, the radar signal being reflected at least in part by the projectile, and the transceiver receiving the reflected signal. From the modulation introduced into the signal through reflection against the projectile, trajectory parameters such as the position and velocity of the projectile can be extracted through methods well known in the art. Specifically, the radial velocity of the projectile relative to the radar transceiver can be obtained from a Doppler shift in the reflected signal.

The strongest reflections of the radar signal frequently occur on asymmetric or uneven parts of the projectile. For an otherwise mostly spherically symmetric projectile such as e.g. a sports ball, reflections might occur in a place where two halves of the sports ball are joined, e.g., glued together. If the material of the projectile is at least partially transparent to radio waves, as is the case with many polymer-based materials, reflection can also occur from inhomogeneities in the material within the projectile. Occasionally, markings are added to sports balls to assist in observation and tracking with radar transceivers or other sensors, and these may also reflect radar signals. Some sports balls may also be configured to facilitate determination of spin using electromagnetic signals. For instance, an electrically conducting material may be arranged in the sports ball interior.

As an example, consider a spherical projectile, e.g. a ball, moving away from the radar transceiver and simultaneously spinning around an axis of the ball. The largest contribution to the observed radial velocity will in this case be the center radial velocity of the projectile, i.e. the radial velocity that would be observed if the projectile were not spinning. This center radial velocity normally coincides with a radial velocity of the center of mass of the projectile relative to the radar transceiver. For a spinning projectile, however, the momentary observed radial velocity of the projectile relative to the radar transceiver will depend on the movement around the rotational axis of the part of the projectile causing the strongest reflection. When the part of the projectile causing the strongest reflection is rotating away from the transceiver, the momentary observed radial velocity will be higher than the center radial velocity. Conversely, when the part of the projectile causing strongest reflection is on the side rotating towards the transceiver, the momentary observed radial velocity will be lower than the center radial velocity. This periodic variation of the observed radial velocity around the center radial velocity can be used to extract the spin rate of the projectile. The spin rate can be determined in this way for most orientations of the rotational axis. The exception is a scenario where the rotational axis points towards the transceiver at every point in the projectile trajectory. However, such scenarios are very rare.

FIG. 1 shows a radar transceiver 100 monitoring the path of a projectile 110 by way of an emitted radar signal 101 and a reflected radar signal 102. The radar generates a series of observations of the path of the projectile, comprising information about the radial velocity of the projectile relative to the radar transceiver. The projectile 110 rotates about an axis 111 with a frequency of rotation, or spin rate, 112. Herein, spin is a spin rate, typically measured in terms of the number of full revolutions of the projectile around its rotational axis per unit time, e.g. in revolutions per minute (RPM) or revolutions per second (RPS).

Figure 2A:
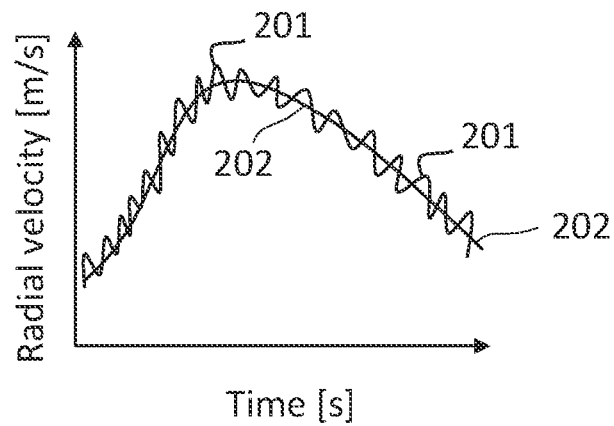
Figure 2B:
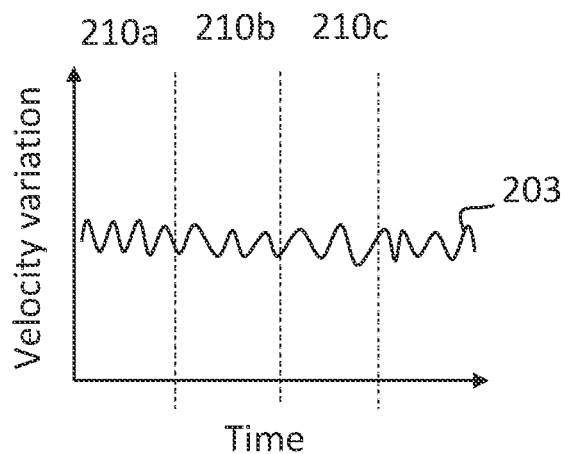
Figure 3:
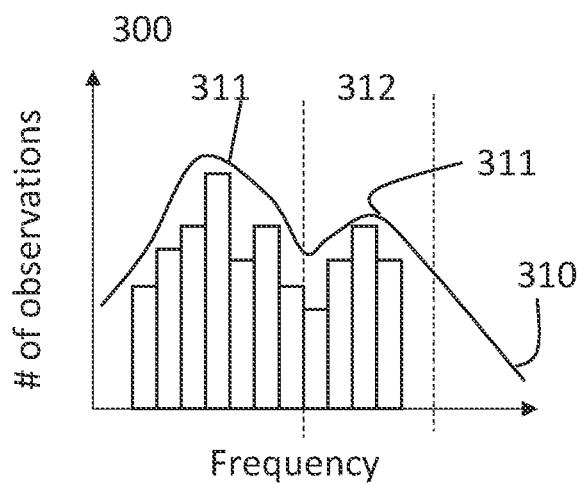
Figure 4:
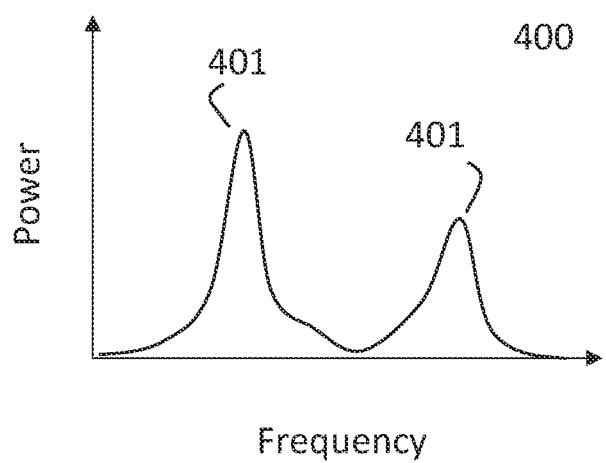

FIG. 2a shows a first time series 201 of observations of the radial velocity, given, e.g., in m/s, together with the center radial velocity 202. Note that the observations of radial velocity exhibit a variation around the center radial velocity. In fact, the center radial velocity may be seen as an average radial velocity of the projectile with respect to the radar transceiver, while the observations of radial velocity vary around this center velocity. FIG. 2b schematically shows the difference between the observed radial velocity and the center velocity over time, i.e. it shows a second time series 203 comprising the variation in the radial velocity around the center radial velocity.

Figure 5:
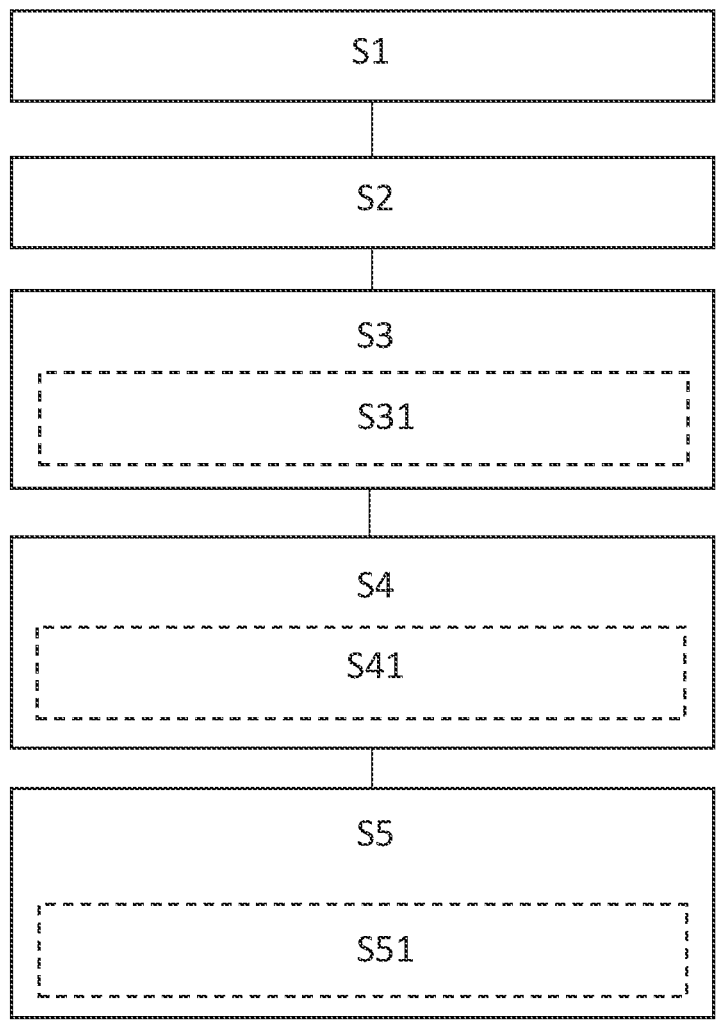
FIG. 5 is a flowchart illustrating methods in a radar transceiver according to the present disclosure.
Figure 6:
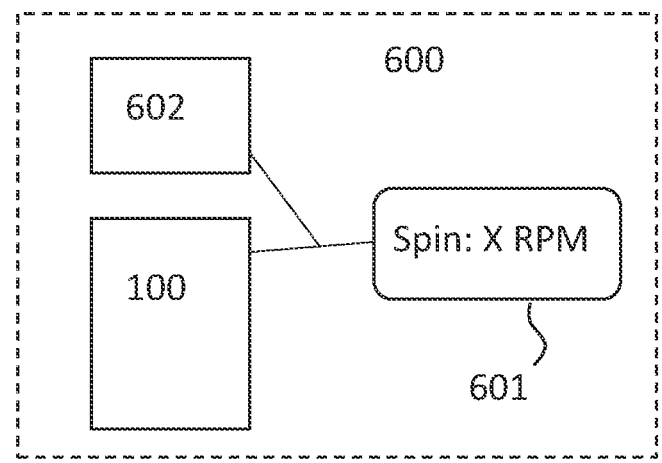
FIG. 6 is a block diagram of a system comprising a radar transceiver.
Figure 7:
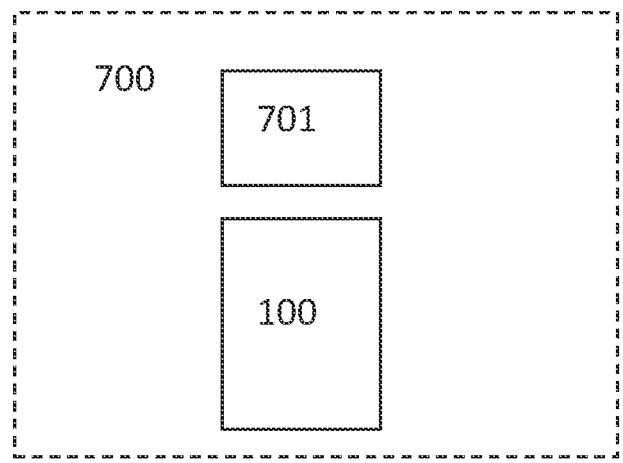
FIG. 7 is a block diagram of a system comprising a radar transceiver and a processor.

The method for estimating a spin of a projectile 110 disclosed here and shown in FIG. 5 comprises obtaining S1 from a radar transceiver 100 a first time series 201 comprising observations of a radial velocity of the projectile 110 relative to the radar transceiver 100, and calculating S2, from the first time series 201, a center velocity 202 of the projectile 110. The method further comprises extracting S3 a second time series 203 comprising a variation in the first time series around the center velocity 202, estimating S4 a frequency of the second time series 203, and determining S5 the spin of the projectile 110 based on the frequency of the second time series 203. The projectile 110 may be a sports ball, such as a baseball, soccer ball, or golf ball.

The connection between the frequency of the second time series 203 and the spin of the projectile 110 is, in general, that the frequency of the second times series 203 is also the frequency of rotation and thus equivalent to the spin rate. It should however be noted that the frequency of the second time series 203 may also be e.g. a higher harmonic of the frequency of rotation. Harmonics, or integer multiples, of the frequency of rotation will be present in the second time series 203, and both the frequency of rotation and each higher harmonic will be associated with a signal strength. The strength of the harmonics relative to that of the frequency of rotation may depend on such things as whether more than one part of the projectile is causing reflection of the radar signal. Note that the signal strength for a harmonic may be zero.

Depending on how the projectile is launched it may also experience a temporary deformation during part of its trajectory, as can be the case for a sports ball such as a golf ball that is hit by an implement such as a golf club. The impact can cause a temporary compression of the sports ball, which then results in a gradually declining temporary deformation of the sports ball during flight. This deformation then impacts the reflection of the radar signal and may introduce a second periodic variation with a frequency that is not directly related to the spin rate.

Optionally, the method may also comprise dividing S31 the second time series 203 into a plurality of time intervals 210a, 210b, 210c, estimating S41 a plurality of frequencies of the second time series 203, where each frequency corresponds to a respective time interval in the plurality of time intervals 210a, 210b, 210c, and determining S51 the spin of the projectile 110 based on the plurality of estimated frequencies. A length of a time interval may be the time in which the projectile will cover a set distance, where the time is calculated using a known center velocity of the projectile. The set distance may for example be 30-40 m. The length of the time interval may also be set such that a desired signal-to-noise ratio and resolution is obtained for the estimated frequency. Optionally, the length of a time interval may be between 250 and 500 milliseconds.

Dividing the second time series 203 into a plurality of time intervals makes it possible to obtain a plurality of initial estimated frequencies. The estimated value of the frequency of the second time series 203 can be affected by measurement noise or measurement errors, rendering a single estimated frequency of the second time series 203 potentially unreliable. With a plurality of estimated frequencies, it is possible to apply statistical methods to obtain a final estimate of the frequency that is more reliable than an estimate derived from a single time interval.

Determining S51 the spin of the projectile 110 based on the plurality of estimated frequencies may also comprise obtaining a distribution 300 of the plurality of estimated frequencies. From a distribution of a plurality of estimated frequencies it is possible to extract a final estimate of the frequency.

As an example, the final estimate of the frequency can be extracted through calculating a probability density function 310 for the plurality of estimated frequencies, optionally as a convolution of a histogram of the plurality of estimated frequencies with a kernel, optionally a Gaussian kernel. Subsequently the frequency corresponding to one of the resulting local maxima 311 in the probability density function 310 is identified as the final estimate of the frequency. Selection of the correct local maximum 311 can for example be performed on the basis of a probability mass associated with each local maximum. The probability mass corresponds to the integral of the probability density function in an interval 312 comprising the local maximum. The interval may be limited by the points closest to the local maximum at which the probability density function falls below a fixed threshold value or below a value corresponding to a percentage of the height of the local maximum.

Selection of the correct local maximum 311 can also be performed on the basis of how many of the estimated frequencies in the plurality of estimated frequencies are equal or close to the frequency corresponding to the local maximum, optionally taking into account the number of estimates of the frequencies associated with other local maxima that correspond to harmonics of the frequency corresponding to the local maximum.

If the periodic variation in the observed radial velocity due to spin is to be detectable in the first time series 201 and the second time series 203, a time interval between observations in the time series 201 cannot exceed a period of rotation of the projectile due to the spin. If a highest expected value of the spin is known, the time interval between observations in the first time series 201 may be set to half the expected period of rotation of the projectile 110 at a highest expected spin. The time interval can also be less than half the expected period of rotation.

As an example, the time interval between observations in the first time series 201 may be constant. As another example, the time interval between observations in the first time series 201 may be variable.

The calculation S2 of a center velocity 202 of the projectile 110 from the first time series 201 may as an example be performed though use of a low-pass filter. A cut-off frequency for the low-pass filter may then be configured in dependence of an expected variation in velocity along the projectile trajectory. As another example, the center velocity 202 may be calculated through piecewise fitting of a function to the first time series 201. Extraction S3 of the second time series 203 may then be performed through subtraction of the determined center velocity 202 from the first time series 201.

Estimating S4 the frequency of the second time series 203 may comprise using a power spectrum 400 calculated from the second time series 203 as a basis for a maximum likelihood estimation of the frequency. The power spectrum can for example be found as the square of the absolute value of the Fourier transform of the second time series 203. Optionally, another representation of the power density of the signal at different frequencies can be used, such as a periodogram.

A maximum likelihood estimation of the frequency may for example be obtained as follows. A plurality of candidate frequencies may be obtained, for example based on the frequencies at which the power spectrum 400 has local maxima 401. For each candidate frequency, the height of the corresponding peak and peaks at integer multiples of the candidate frequency (i.e. harmonics) are added together to yield a measure of the total power in the signal associated with the candidate frequency. The candidate frequency with the highest measure of total power is then selected as the estimated frequency of the second time series 203. Maximum likelihood estimation of a frequency, in particular a fundamental frequency, is well known in the art.

Optionally, the frequency may be a fundamental frequency. The fundamental frequency is herein defined as in the field of harmonic analysis, i.e. as the lowest frequency present in a periodic signal, the signal in this case being the second time series 203.

There is also herein disclosed a radar transceiver 100 arranged to obtain S1 a first time series 201 comprising observations of a radial velocity of the projectile 110 relative to the radar transceiver 100, calculate S2, from the first time series 201, a center velocity 202 of the projectile 110, extract S3 a second time series 203 comprising a variation in the first time series 201 around the center velocity 202, estimate S4 a frequency of the second time series 203, and determine S5 the spin of the projectile 110 based on the estimated frequency of the second time series 203.

The radar transceiver may also be arranged to divide S31 the second time series 203 into a plurality of time intervals, estimate S41 a plurality of frequencies of the second time series 203, where each frequency corresponds to a respective time interval in the plurality of time intervals, and determine S51 the spin of the projectile 110 based on the plurality of estimated frequencies.

The radar transceiver described above may, as an example, be a frequency modulated continuous wave, FMCW, radar transceiver. As another example, the radar transceiver may be a pulse-Doppler radar. In addition to spin, the radar transceiver may be arranged to measure other properties of the projectile trajectory, such as velocity and position or the projectile 110 at different times.

There is also herein disclosed a system 600 for measurement of the spin of a projectile 110, the system comprising a radar transceiver 100 as described above and at least one means 601 of displaying the determined spin. A means 601 of displaying the determined spin may be a display, such as a LED or LCD display. A means of displaying the determined spin may also be a computer running a computer program capable of displaying the determined spin. Optionally, other properties of the projectile trajectory, such as velocity and position of the projectile 110 at different times, may be displayed together with the determined spin.

The system 600 may also comprise an auxiliary sensor 602, wherein the spin estimate from the radar transceiver 100 is combined with data obtained from the auxiliary sensor 602. As an example, the auxiliary sensor may be a camera. As another example, the auxiliary sensor may be a LIDAR or sonar sensor.

There is also herein disclosed a processor 701 arranged to obtain S1 a first time series 201 comprising observations of a radial velocity of the projectile 110 relative to the radar transceiver 100, calculate S2, from the first time series 201, a center velocity 202 of the projectile 110, extract S3 a second time series 203 comprising a variation in the first time series 201 around the center velocity, estimate S4 a frequency of the second time series 203, and determine S5 the spin of the projectile 110 based on the frequency of the second time series 203.

The processor 701 may also be arranged to divide S31 the second time series 203 into a plurality of time intervals, estimate S41 a plurality of frequencies of the second time series 203, where each frequency corresponds to a respective time interval in the plurality of time intervals, and determine S51 the spin of the projectile 110 based on the plurality of estimated frequencies.

There is also disclosed a system 700 comprising a radar transceiver 100 and a processor 701 as described above.

Finally, there is herein disclosed a computer program for operating a radar transceiver 100 or processor 701 to determine the spin of a projectile 110, the computer program comprising computer code which, when run on processing circuitry of a radar transceiver 100 causes the radar transceiver 100 to execute a method as described above, and a computer program product comprising a computer program as described, and a computer readable storage medium on which the computer program is stored.

The invention claimed is:

1. A method for estimating a spin of a projectile, the method comprising:
   emitting, by a radar transceiver, a radar signal;
   receiving, by the radar transceiver, a reflected signal being at least in part the radar signal reflected by the projectile;
   extracting from the reflected signal a first time series comprising observations of a radial velocity of the projectile relative to the radar transceiver;
   calculating, from the first time series, a center velocity of the projectile;
   extracting from the first time series a second time series comprising a variation of the radial velocity in the first time series around the calculated center velocity;
   estimating a frequency of the variation of the radial velocity of the second time series; and
   determining the spin of the projectile based on the estimated frequency of the variation of the radial velocity of the second time series, wherein the spin is a rate of rotation of the projectile.

2. The method according to claim 1, wherein the method comprises:
   dividing the second time series into a plurality of time intervals;
   estimating a plurality of frequencies of the variation of the radial velocity of the second time series, where each frequency corresponds to a respective time interval in the plurality of time intervals; and
   determining the spin of the projectile based on the plurality of estimated frequencies.

3. The method according to claim 2, wherein determining the spin of the projectile based on the plurality of estimated frequencies comprises obtaining a distribution of the plurality of estimated frequencies.

4. The method according to claim 1, where a time interval between observations in the first time series is at most half an expected period of rotation of the projectile at a highest expected spin.

5. The method according to claim 4, where the time interval between observations in the first time series is constant.

6. The method according to claim 4, where the time interval between observations in the first time series is variable.

7. The method according to claim 1, wherein the center velocity is calculated through use of a low-pass filter.

8. The method according to claim 1, wherein the center velocity is calculated through piecewise fitting of a function to the first time series.

9. The method according to claim 1, wherein the second time series is extracted through subtraction of the calculated center velocity from the first time series.

10. The method according to claim 1, wherein estimating the frequency of the variation of the radial velocity of the second time series comprises using a power spectrum calculated from the second time series as a basis for a maximum likelihood estimation of the frequency.

11. The method according to claim 1, where the frequency is a fundamental frequency.

12. A system comprising:
a radar transceiver configured and arranged to emit a radar signal, and receive a reflected signal being at least in part the radar signal reflected by a projectile; and
a processor configured to
extract from the reflected signal a first time series comprising observations of a radial velocity of the projectile relative to the radar transceiver;
calculate, from the first time series, a center velocity of the projectile;
extract from the first time series a second time series comprising a variation in the radial velocity in the first time series around the calculated center velocity;
estimate a frequency of the variation in the radial velocity of the second time series; and
determine the spin of the projectile based on the estimated frequency of the variation in the radial velocity of the second time series, wherein the spin is a rate of rotation of the projectile.

13. The system A radar transceiver according to claim 12, wherein the processor is configured further arranged to divide the second time series into a plurality of time intervals; estimate a plurality of frequencies of the variation in the radial velocity of the second time series, where each frequency corresponds to a respective time interval in the plurality of time intervals; and determine the spin of the projectile based on the plurality of estimated frequencies.

14. The system according to claim 12, where the radar transceiver is a frequency modulated continuous wave, FMCW, radar transceiver.

15. The system according to claim 12, comprising a display, wherein the processor is configured to display other properties of the projectile together with the spin of the projectile on the display.

16. The system according to claim 15, comprising an auxiliary sensor, wherein the spin of the projectile is combined with data obtained from the auxiliary sensor.

17. The system according to claim 12, where a time interval between observations in the first time series is at most half an expected period of rotation of the projectile at a highest expected spin.

* * * * *

UNITED STATES PATENT AND TRADEMARK OFFICE
CERTIFICATE OF CORRECTION

PATENT NO. : 11,513,208 B2  
APPLICATION NO. : 17/613678  
DATED : November 29, 2022  
INVENTOR(S) : Jonny Eriksson Page 1 of 1

It is certified that error appears in the above-identified patent and that said Letters Patent is hereby corrected as shown below:

On the Title Page

In Column 2 (Abstract) Line 8 Delete "velocity" and insert --velocity,--.

In Column 2 (Abstract) Line 10 Before "based" delete "WO".

In the Claims

In Column 10 Line 3 In Claim 13, after "system" delete "A radar transceiver".

In Column 10 Line 4 In Claim 13, after "configured" delete "further arranged".

Signed and Sealed this  
Eighth Day of October, 2024

Katherine Kelly Vidal  
*Director of the United States Patent and Trademark Office*